RECORD CONTROLLED MACHINE

Filed Dec. 21, 1951

INVENTOR
ULRICH KOLM
ATTORNEY

United States Patent Office 2,894,627

Patented July 14, 1959

2,894,627

RECORD CONTROLLED MACHINE

Ulrich Kölm, Berlin-Wannsee, Germany, assignor to I.B.M. Deutschland-Internationale Buro Maschinen Gesellschaft m.b.H., Wurttemburg, Germany, a corporation of Germany Application December 21, 1951, Serial No. 262,865

10 Claims. (Cl. 209—110)

This invention relates to record controlled distributing machines.

The primary object is to improve machines of the type disclosed in Patent 2,558,941, issued July 3, 1951.

In this patent there is disclosed a machine which, among other things, is capable of sorting accounting and statistical records and the sorting mechanism is similar to the one disclosed in Patent 1,741,985. The machine of Patent 2,558,941 is equipped with a means of checking the destination selected for a card with the actual destination so arranged that if there is a disparity between the selected destination and the actual destination the machine may be caused to stop and an indicator light indicates failure of the machine to sort the card correctly or at least indicates that some kind of an error has been committed either in the operation of the machine or in the circuits which select the destination for the card. The machine also is equipped with a device which makes a mark on a card which is destined for a pocket which does not agree with the selected destination. However, the operator has the burden of examining all of the pockets to determine in which pocket the marked card fell and, if the marking device is not in use, the operator has to inspect one or more of the cards in each pocket and endeavor to determine by inspection which card involves a potential error either in punching the card, selecting its destination, or a misoperation of the sorting mechanism.

There are a number of reasons why a card may fail to sort properly. In the machine of Patent 2,558,941 the distribution of the records may be based on some purely arbitrary combination of designations occurring in the record which designations set up relays in certain combinations, according to the manner in which the machine is initially conditioned for operation, with the result that, if a card is sorted in error or some other error occurs in connection therewith, it is very difficult to tell by inspection of the card whether it was mis-sorted or not or whether the machine failed to operate properly.

The present invention is concerned with the provision of an indicator device in combination with a checking circuit arrangement which will detect when a card will be sent to a different destination than the selected one and will indicate to the operator the sorting pocket into which the card actually falls so that the operator may instantly remove the card and more quickly ascertain the reason why the card mis-sorted. This checking circuit is arranged to not only detect mis-sorting of the card but also to detect double punching and false operations which arise from the presence of conductive areas in the same column as a perforation as, for example, when a card has a carbon spot as well as a perforation in the same column. The present invention provides a separate indicator device which indicates when the card is double punched, torn, or has a conductive area.

Other objects of the invention will be pointed out in the following description and claims and illustrated in the accompanying drawings, which disclose, by way of examples, the principle of the invention and the best mode, which has been contemplated, of applying that principle.

Figures 1, 2, 3, 4:
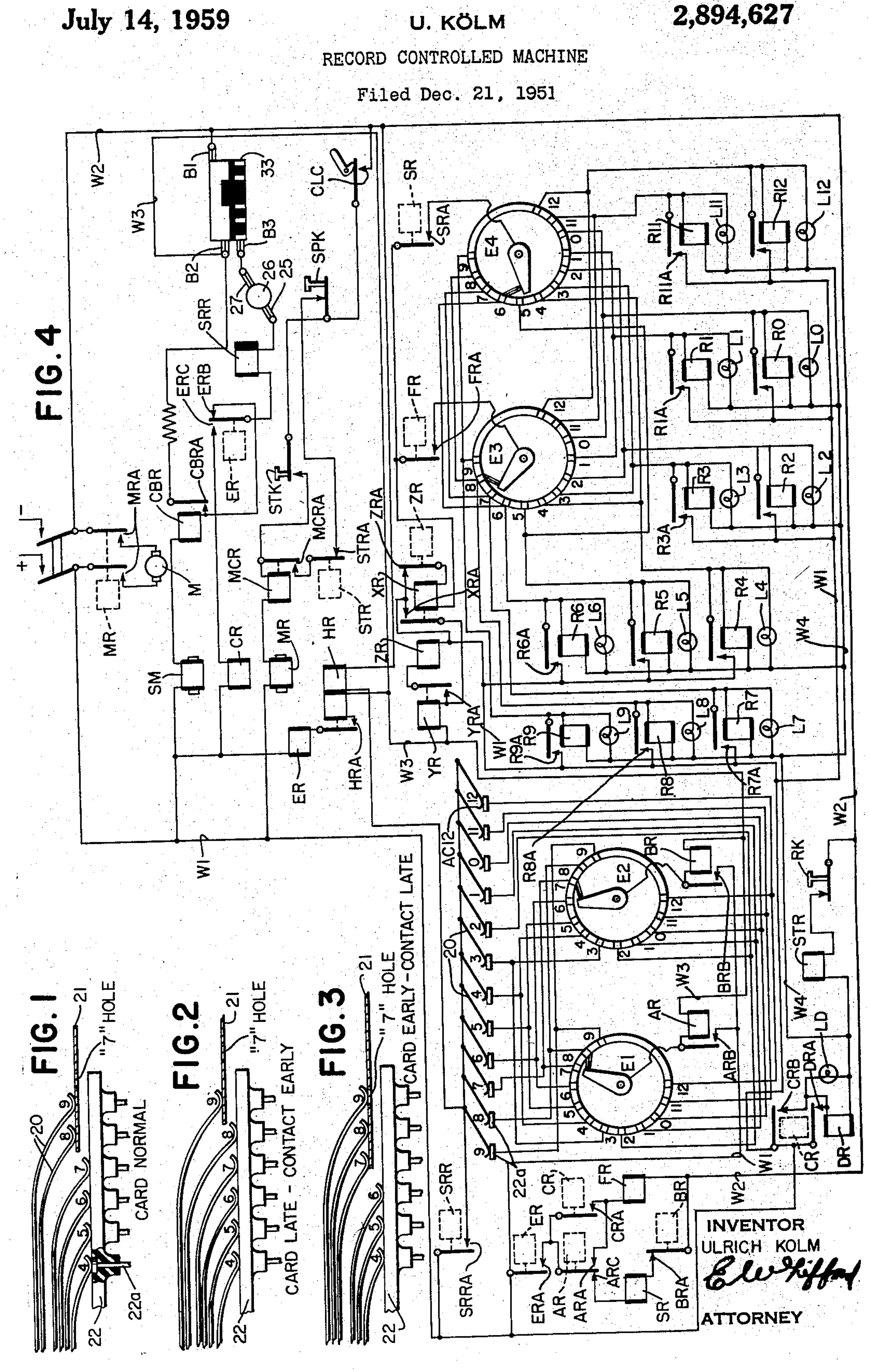
Fig. 1 is a diagrammatic view showing the relation of the sorting blades to the checking commutator strip on the sorting magnet armature to cause a card to be correctly sorted into the "7" pocket in consequence of the "7" pocket having been initially selected.
Fig. 2 is a view showing the relationship the sorting blades have to the checking commutator when the card is behind in machine time, or in other words, the contact closure to select the pocket occurs too early.
Fig. 3 is a view showing the relationship of the blades to the checking commutator when the card is early, that is, the contact closure late.
Fig. 4 is a wiring diagram.

In order to simplify the disclosure, the invention is shown as applied to a simple sorting machine equipped with a checking commutator arrangement which may be similar to the one disclosed in Fig. 9 of Patent 2,558,941. This commutator is shown diagrammatically in the drawings as its specific construction is of no importance in the present case. Further to simplify the disclosure, the means of closing a contact representative of a card destination in the present case consists of the usual card brush and brush relay arranged in a manner generally similar to Patent 1,741,985 and operating in a conventional way. However, it will be understood that, instead of closing the circuit to select a pocket through the card brush and the timing which is incidental to the differential position of the hole in the card column a selecting commutator and system of storage relays such as shown in Patent 2,558,941 may be used, the card brush in such case being replaced by a group of storage relay contacts representing card pockets and an emitter so that a differentially timed pocket selecting impulse may be emitted to correspond with the timing control which normally is exercised by the card brush.

In Fig. 4 the normal sorting circuit which initially is closed to select a destination for a card consists of the sorting magnet SM, the card brush relay CBR, the normally closed contacts ERB, the slow release relay SRR, the usual card sensing brush 25, common contact roller 26, common brush 27, the timing brush B3 of the usual selecting commutator 33 and the common brush B1 of the selecting commutator 33. The normal holding circuit for the card brush relay CBR extends through its contacts CBRA, the brush B2 of the commutator 33, and the common contact segment of commutator 33. This commutator 33 is the usual selecting commutator with which sorting machines of this type are equipped and has provisions for rendering the commutator selectively operable with respect to specific index-point positions. In the present case it will be assumed that this commutator has been manually made operative for each index-point position in the card.

The machine is started in operation by depressing the usual start key STK (Fig. 4), closing a circuit as follows: line wire W1, motor relay MR, motor control relay MCR, start key STK, and card lever contact CLC, to line wire W2. The motor control relay MCR, through its contacts MCRA and the contacts STRA, establishes a holding circuit for the motor relay MR through the stop key STK and the card lever contact CLC which keeps the machine in operation as long as cards continue to feed through the machine in the usual way. The motor relay MR closes contacts MRA and starts the driving motor M. The foregoing circuits are the conventional circuits found in a sorting machine of the general type disclosed in Patent 1,741,985 which has been modified somewhat in Patent 2,558,941 to provide for the sensing of the card and the storage in a system of storage relays of a value representing the pocket to be ultimately selected for the card.

The brush 25 encountering a hole in any given index-point position of the card, closes a circuit for the brush relay CBR and magnet SM over a circuit from line wire W1, sorting magnet SM, relay CBR, contacts ERB, slow release relay SRR, brush 25 through the perforation in the card, the contact roller 26 and brush 27, B3 and B1 to line wire W2. This causes the energization of the sorting magnet SM which attracts its armature and operates the sorting blades 20 (Fig. 1) in a well-known way to select a destination for the card. The contacts CBRA close the usual holding circuit for magnet SM and relay CBR through the brushes B1 and B2 and the common contact segment of commutator 33 which is arranged to break the holding circuit at the end of each card cycle.

Under normal conditions, the attraction of the sorting magnet at timed intervals in the card cycle determined by the position of the perforation in the card column causes the armature of the sorting magnet to drop at the proper time for a card 21 (Fig. 1) to pass over the blade 20 leading to the proper pocket for the card. In Fig. 1 the relation of the sorting blades 20 to the card at the moment of energization of the sorting magnet 25 for a card punched "7" is illustrated. It will be seen that this card will be guided into the space between the "7" blade and the "8" blade and will ultimately become deposited in the "7" pocket. In the present case, the armature of the sorting magnet SM is equipped with a checking commutator strip which is generally designated 22 and includes conductive inserts 22*a* individual to each blade on which the upturned end of the blade normally rests. Thus, in Fig. 1 all the blades 20 except those which lead to the "8" and "9" pockets are allowed to drop and make contact with the conductive inserts 22*a* associated therewith. This represents the normal condition and, when it exists, the card is sorted normally and there is no error indication made.

For the purpose of indicating the pocket into which a card is mis-sorted or only appears to be erroneously sorted, there is provided a group of indicator lights which are designated L1 to L9, L0, L11, L12, respectively, corresponding to each of the sorting pockets and these lights may be located in close proximity to the pockets which they designate. There is also provided a thirteenth light designated LD which is for the purpose of indicating duplicate perforations or the presence of conductive spots in the same column and having the same effect as a perforation. These lamps are controlled by a system of relays R1 to R9, R0, R11, R12 and a series of impulse emitters which are designated E1 to E4 in Fig. 4. It will be noted with reference to Fig. 4, that the emitters E1 and E3 and the commutators E2 and E4 are paired in timing and are shown in the position they occupy at the instant the card brush senses a "7" perforation. The segments of these commutators are designated 12, 11, 0 and 1 to 9 in a clockwise direction to correspond with the order of sensing a card column by brush 25. The brushes of the emitters E1 to E4 are timed so that, when the sorting brush 25 senses the hole in the card, the brush of emitter E2 will rest on the segment corresponding to the value of the hole in the card, the brushes for emitters E1, E3 will rest on the next highest digitally valued segments thereof, and the brush for emitter E4 will be on the next lowest valued segment as denoted by the small numerals 0 to 9, 11, and 12 around the peripheries of the emitters. Thus, when a card perforated "7," for example, is sensed, the emitters E1 to E4 will have their brushes on the "8," "7," "8," and "6" segments, respectively, as shown in Fig. 1 in which rotation of the emitters is counterclockwise.

At the instant the card sensing brush 25 senses the "7" hole in the card, relay SRR will be energized in the manner described above and will momentarily close its contacts SRRA, thus establishing a circuit as follows: line wire W1, contacts SRRA, the "7" blade 20, the "7" conductive insert 22*a*, the brush of emitter E2 which is now resting on the "7" segment, relay BR, wire W3, and brushes B2 and B1 of commutator 33, to line wire W2. Relay BR closes its contacts BRB and establishes a holding circuit for itself directly to the line wire W1. The contacts BRA open to prevent energization of relay SR and the card will become deposited in the "7" pocket in the well-known way.

Relay HR, which is a double coil relay having a holding coil and a pickup coil, has its pickup coil energized directly through the contacts SRRA and closes contacts HRA to connect its holding coil and relay ER in a series circuit from line wire W1 through wire W3 and the brushes B2 and B1 of commutator 33 to line wire W2. This circuit, however, has no effect under the present conditions. Relay ER closes contacts ERC but also has no effect due to the short duration of the impulse through brush 25.

Now let it be assumed that for some reason or other the card is late in time and its leading edge has not yet passed under the "8" blade at the time the card brush 25 senses the "7" hole in the card or a "7" sorting impulse occurs. This situation is shown in Fig. 2 where it will be noted that the "8" blade is not held up by the card but is resting on its conductive insert 22*a*, thus enabling a circuit to be established through the emitter E1 as follows: line wire W1, contacts SRRA, the "8" blade 20 and insert 22*a*, the "8" segment of emitter E1, relay AR, wire W3 and brushes B2, B1, to line W2. Since the "7" blade and its insert 22*a* are also in contact at this time, the relay BR will be energized in parallel with relay AR and both relays will establish holding circuits over wire W3 through their contacts ARB and BRB as described above. The relays HR and ER will be energized as before and a circuit will now be established from line wire W1 through contacts ERA, ARA, and relay FR, to line wire W2.

Relay FR closes its contacts FRA and thereby allows a circuit to be set up as follows: line wire W1, contacts ZRA, relay XR, contacts FRA, the brush of emitter E3 and the "8" segment thereof, relay R8, wire W4, relay STR, and release key contacts RK, to line wire W2. Relay R8 closes its contacts R8A and establishes a holding circuit from line wire W1 through the contacts R8A, relay R8, wire W4, relay STR, and contacts RK, to line wire W2. The lamp L8 in parallel with relay R8 is illuminated and the relays R8 and STR remain energized continuously.

The relay STR opens its contacts STRA and deenergizes the motor control relay MCR and motor relay MR causing the sorting machine to stop. The card which caused the energization of relay R8 will be guided to the "8" pocket and the lamp L8, being associated with the "8" pocket, will indicate to the operator where to find the card which mis-sorted or at least appears to be mis-sorted.

It must be kept in mind that the sorting mechanisms may have operated correctly but the sorting impulse may have been incorrect, so that this card, while initially assumed to be a "7" punched card which sorted in error into the "8" pocket, might actually be an "8" punched card and the error might have been in the operation of the circuits causing the card to be treated as if it were in error. Naturally, it is desired to not only find out where cards are erroneously sorted but also to detect misoperations in the machine which otherwise would not be detectable.

In the machine of Patent 2,558,941, the sorting impulses are derived from an emitter which is controlled by a series of storage relays and the storage relays are supposed to be energized only one at a time under the control of pocket selection networks controlled by the so-called "re-code selectors" to select a particular pocket for a card having a certain pattern of perforations or data relationships. It is possible for one of these recode relays to fail to operate, or too many to operate and cause two different storage relays to be energized and thereby select two possible destinations for a record. Thus, the circuit which selects the pocket might be closed at "7" where it should be closed at "8" or vice versa and, in the case of a card which is correctly punched "7" or associated with a correct impulse representing "7," the erroneous "8" impulse occurring earlier in machine time than the "7" impulse, will determine the selection of the card so that the card punched "7" will actually enter the "8" pocket. The machine, of course, has no means of detecting which of the impulses is the correct one, so that all operations wherein the pocket selecting impulses and the actual destination selected for the card fail to agree must be treated with suspicion and checked to determine whether the fault lies in the card or in the operation of the machine. After locating the card in error, the operator may actuate the reset key RK and open the holding circuit for relay STR, thereby, at the same time deenergizing the relay R8 and causing lamp L8 to become extinguished. The deenergization of relay STR permits the machine to be re-started by means of start key STK.

It may happen that the card which is correctly punched "7," or selected by a "7" impulse when a storage relay system is used, is actually too early, that is, the leading edge of the card is advanced so far that at the "7" point in the cycle when the card should be in the position of Fig. 1 it actually is in the position of Fig. 3 and will become deposited in the "6" pocket instead of the "7" pocket. In the case of Fig. 3 the contact time between the card brush and the contact roller is late and the card is ahead of time. When this situation occurs, it will be noted that neither the "7" nor the "8" blade is in contact with a conductive segment 22a so that no circuits through emitters E1, E2 are closed.

At the "7" point in the cycle the relay SRR will be energized as before but in this case no impulses can be sent through the relays AR or BR and the contacts ARA and BRA remain closed. This causes relay SR to be energized over a circuit from line wire W1 through contacts ERA, the normally closed contacts ARC of relay AR, relay SR, and contacts BRA, to line wire W2. The closure of contacts SRA enables a circuit to be established similar to the one through contacts FRA, but through the "6" segment of emitter E4 to the relay R6 and lamp L6, the circuit otherwise being traced the same as for the relay R8 and lamp L8, so that relay STR is again energized causing the machine to stop and the lamp L6 will light indicating that the card in error was deposited in the "6" pocket.

The circuit connections are so arranged that it is possible to detect double punching and the presence of conductive spots on the cards which have the same effect electrically as a perforation. Let it be supposed that the card is correctly punched "7" but has a "5" hole or a conductive spot which would have the same effect as a "5" hole. So far as the sorting of the card is concerned, it will be correctly sorted because the "7" hole, dominating in point of time over the "5" hole, will cause the card to be sorted into the "7" pocket and at "7" time in the cycle the relay BR will be energized as before. The relay ER will transfer the slow release relay SRR from in series with the card brush relay R to in series with control relay CR through the contacts ERC. If there should be a second hole in the same column, which is assumed to be a "5" hole in the present case, the relay SRR will be energized a second time and cause relay CR to be energized instead of relay CBR. The relay CR will close contacts CRA and cause relay FR to be energized and, through contact CRB, will cause relay DR, lamp LD, and relay STR to be energized through the contacts RK. The relay FR, however, has no effect in this case for a reason which will be made plain hereinafter. The relay STR causes the machine to stop and the lamp LD indicates to the operator that the machine stopped because the card had a double punch, or a conductive spot, or, when controlled by a storage system like in Patent 2,558,941, that two sorting impulses were applied to the sorting magnet only one of which could have any effect.

The circuit through emitter E3 or E4 can only be established once in any one cycle through the control exercised by the relays XR, YR, and ZR. It will be noted that relay XR has its contacts XRA connected in series parallel relation with the relay ZR and contacts YRA. When contacts XRA close, relay YR is energized and will close contacts YRA. However, at this instant contacts XRA act as a short circuit for the coil of relay ZR momentarily, so that relay ZR is not immediately energized. As soon as the emitter E3 or E4 moves on to the next segment, relay XR is deenergized and causes relay ZR to be energized by removing the shunt thereon so that relay ZR remains energized through a holding circuit from line wire W1 through relay ZR, contacts YRA and relay YR through the brushes B2, B1 to line wire W2. This holds contact ZRA open and prevents a second energization during the same cycle of the relay RX and also prevents circuits from being made through the emitters E3 and E4.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a sorting machine having a series of sorting blades for diverting records having data representations to any one of a plurality of different destinations, means for feeding the records past the ends of said blades, means for moving said blades at right angles to said record at different times during the progress of the records past the ends of said blades whereby selectively to open a passage for each record to one of said destinations, the combination of means for detecting the actual destination of a record including a series of contact elements over which each record passes during its progress past said blades, each of said elements normally making electrical contact with the end of one of said blades, said elements being progressively separated from said blades during the passage of the record past the ends of said blades, a series of destination test circuits, means to selectively connect a group of said test circuits to the contact element corresponding to a selected destination and the immediately adjacent elements, means to complete the group of test circuits through said blades when the record has reached the end of the blade corresponding to a selected destination, and means rendered effective by said test circuits for indicating the actual destination when said group of test circuits is selectively interrupted by the presence of a portion of a record between the selected contact element and its blade.

2. In a sorting machine having a series of sorting blades for diverting records having data representations to any one of a plurality of different destinations, means for feeding the records underneath the ends of said blades, means for dropping said blades at different times during the progress of the records underneath said blades whereby selectively to open a passage for each record to one of said destinations the combination of means for detecting the actual destination of a record including a series of contact elements over which each record passes during its progress underneath said blades, each of said elements normally making electrical contact with the end of one of said blades, said elements being progressively separated from said blades during the passage of the record underneath the ends of said blades; a series of destination test circuits, means to selectively connect a group of said test circuits to the contact elements corresponding to a selected destination and to the immediately adjacent contact elements, means to complete the group of test circuits through said blades when the record is selected by dropping the ends of said blades, and a series of indicator devices selectively rendered effective by said test circuits according to how said test circuits are selectively interrupted by the position of a portion of such record with reference to the selected contact elements and their blades.

3. In a sorting machine having a series of sorting blades for diverting records having data representations to any one of a plurality of different destinations, means for feeding the records underneath the ends of said blades, means for dropping said blades at different times during the progress of the records underneath said blades whereby selectively to open a passage for each record to one of said destinations; the combination of means for detecting the actual destination of a record including a series of contact elements over which each record passes during its progress underneath said blades, each of said elements normally making electrical contact with the end of one of said blades, said elements being progressively separated from said blades during the passage of the record underneath the ends of said blades; a plurality of destination test circuits, means to selectively connect a group of said test circuits to the contact elements corresponding to a selected destination, and to immediately adjacent contact elements, means to complete the plurality of test circuits through said blades when the record destination is selected by dropping the ends of said blades, and means rendered effective by said plurality of test circuits to modify the operation of the machine according to how the test circuits in said plurality are interrupted by the presence of a portion of a record between the selected contact element and its blade.

4. In a sorting machine having a series of sorting blades for diverting records having data representations to any one of a plurality of different destinations, means for feeding the records underneath the ends of said blades, means for dropping said blades at different times during the progress of the records underneath said blades whereby selectively to open a passage for each record to one of said destinations; the combination of means to detect the actual destination of a record, including a series of contact elements over which each record passes during its progress underneath said blades, each of said elements normally making electrical contact with the end of one of said blades, said elements being progressively separated from said blades during the passage of the record underneath the ends of said blades; a plurality of destination test circuits, means to selectively connect said test circuits to the contact elements to correspond to selected destinations, means rendered effective by said test circuits for preventing further feeding of records to said blades when the selected destination and actual destination disagree, a series of destination indicators, and means controlled by the test circuits for selecting said indicators according to the actual destination of a record when disagreement occurs.

5. In a sorting machine having a series of sorting blades for diverting records having data representations to any one of a plurality of different destinations, means for feeding the records past the ends of said blades, means for moving said blades laterally of the records at different times during the progress of the records past said blades whereby selectively to open a passage for each record to one of said destinations; the combination of destination detecting means including a series of contact elements over which each record passes during its progress past said blades, each of said elements normally making electrical contact with the end of one of said blades, said elements being progressively separated from said blades during the passage of the record underneath the ends of said blades; a pair of destination test circuits, means to selectively progressively connect one of said test circuits to the contact element corresponding to the blade leading to a selected destination and the other circuit to the element for the next adjacent blade, means to complete said test circuits through said blades when the blades are moved by the moving means, and means rendered effective by said test circuits for indicating the actual destination selected for a record according to the position of said record between the selected contact elements and their blades at the time the moving means is operative.

6. In a record distributing machine having means to feed records having data representations, the combination of means to analyze the representations on each record fed, record distributing mechanism including means for diverting records to different destinations under control of the analyzing means for said representations, means controlled by the record after it has been diverted to designate its actual destination, means to compare the actual destination as designated by the designating means with the destination selected by the distributing mechanism, means to detect that more than one destination has been selected, and means controlled by the comparing means to indicate both the actual destinations and the fact that incorrect destinations have been selected.

7. In a record distributing machine having means to feed records having data representations, the combination of means to sense the representations on each record fed, means to selectively distribute said records in accordance with said representations, means controlled by a record after its distribution has been determined for indicating its actual distribution; means to detect plural distribution selections for a single record, even when one distribution coincides with the actual distribution; and means made effective by the detecting means for indicating both plural destinations and separately indicating the actual distribution.

8. In a machine for sorting accounting and statistical records having means to sort records in accordance with data representations, the combination of a device for detecting the actual destination of a record sorted, means to select the destination of a record to be sorted, means controlled by the detecting means and by the selecting means for determining if a record will be sorted to the selected destination, a series of destination indicator devices, and means made effective by the determining means for selecting one of said devices when the selected destination and actual destination do not correspond.

9. In a record distributing machine having means to feed records having data recorded therein by means of data representations, the combination of means to analyze the representations in each record fed, record distributing mechanism to which the records are fed after analysis by the first means, means controlled by the analyzing means for selecting a distribution by the distributing mechanism for each record in accordance with the analysis of such record; and means, including a series of visual indicator devices, for checking the selected distribution of each record with its actual distribution, and operative to indicate the actual selected destination.

10. In a record distributing machine having means to feed records having data recorded therein by means of data representations, the combination of means to analyze the representations on each record fed, record distributing mechanism to which the analyzed records are fed by the feeding means, means controlled by the analyzing means for controlling the distributing mechanism to select a distribution for each record in accordance with the analysis of such record, means controlled by the record itself for checking the selected distribution of the record with its actual distribution, means to check if more than one distribution has been selected for said record in the event the actual distribution checks with a selected distribution, and means controlled by said checking and analyzing means, respectively, for indicating both the actual distribution and the fact that an incorrect distribution has been selected for a record.

References Cited in the file of this patent

UNITED STATES PATENTS 2,558,941 Durfee ------------------- July 3, 1951